INVENTOR
R. R. BLAIR
BY
ATTORNEY

INVENTOR
R. R. BLAIR

2,815,482
Patented Dec. 3, 1957

2,815,482
APPARATUS FOR TESTING RESISTORS

Royer R. Blair, Berkeley Heights, N. J., assignor to Bell Telephone Laboratories, Incorporated, New York, N. Y., a corporation of New York Application November 9, 1954, Serial No. 467,676

6 Claims. (Cl. 324—62)

This invention relates to apparatus for determining the voltage-current characteristic of resistors and particularly, the voltage-current characteristic of nonlinear resistors.

It is an object of this invention to provide means for indicating and measuring the voltage-current characteristic of a resistor under constant direct-current conditions.

The invention employs an automatic voltage regulation circuit of the type which comprises a series regulator tube and a control amplifier tube. The series regulator tube is connected in series with a direct-current source and a load circuit which includes the test resistor. The control amplifier has its input circuit connected to the load circuit and its output circuit connected to the series regulator tube. The voltage across that portion of the load which is to be maintained at constant voltage is applied to the input circuit of the control amplifier. In employing this circuit in the practice of this invention it is desired that the measurement of the test resistor be made under constant direct-current conditions. Therefore, the connections are so made that a constant direct voltage is maintained across a linear resistor connected in series with the test resistor.

A feature of the invention resides in the means provided for measuring, with a conventional voltmeter, the voltage across a test resistor supplied with a constant current.

Figure 1:
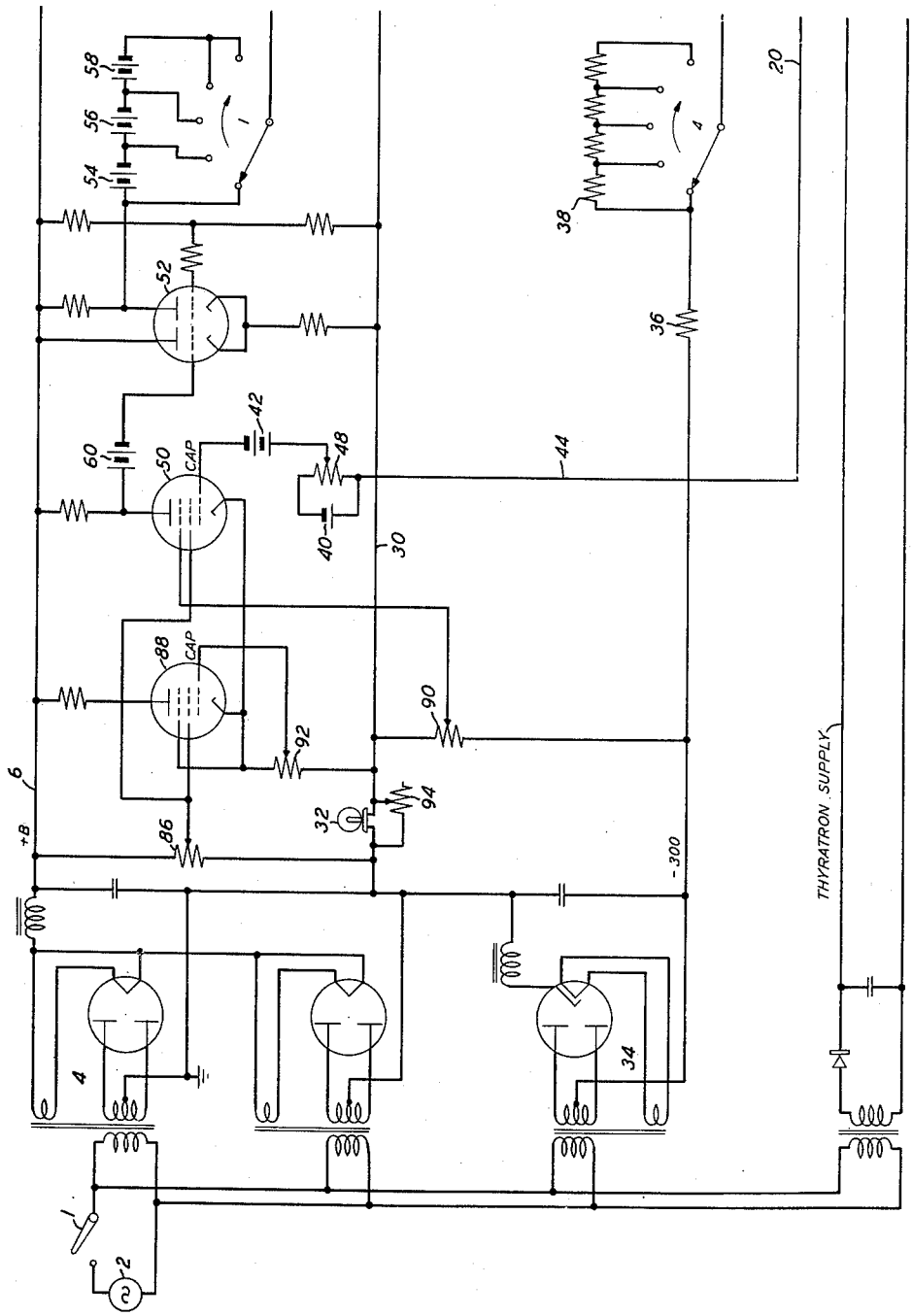
Figure 2:
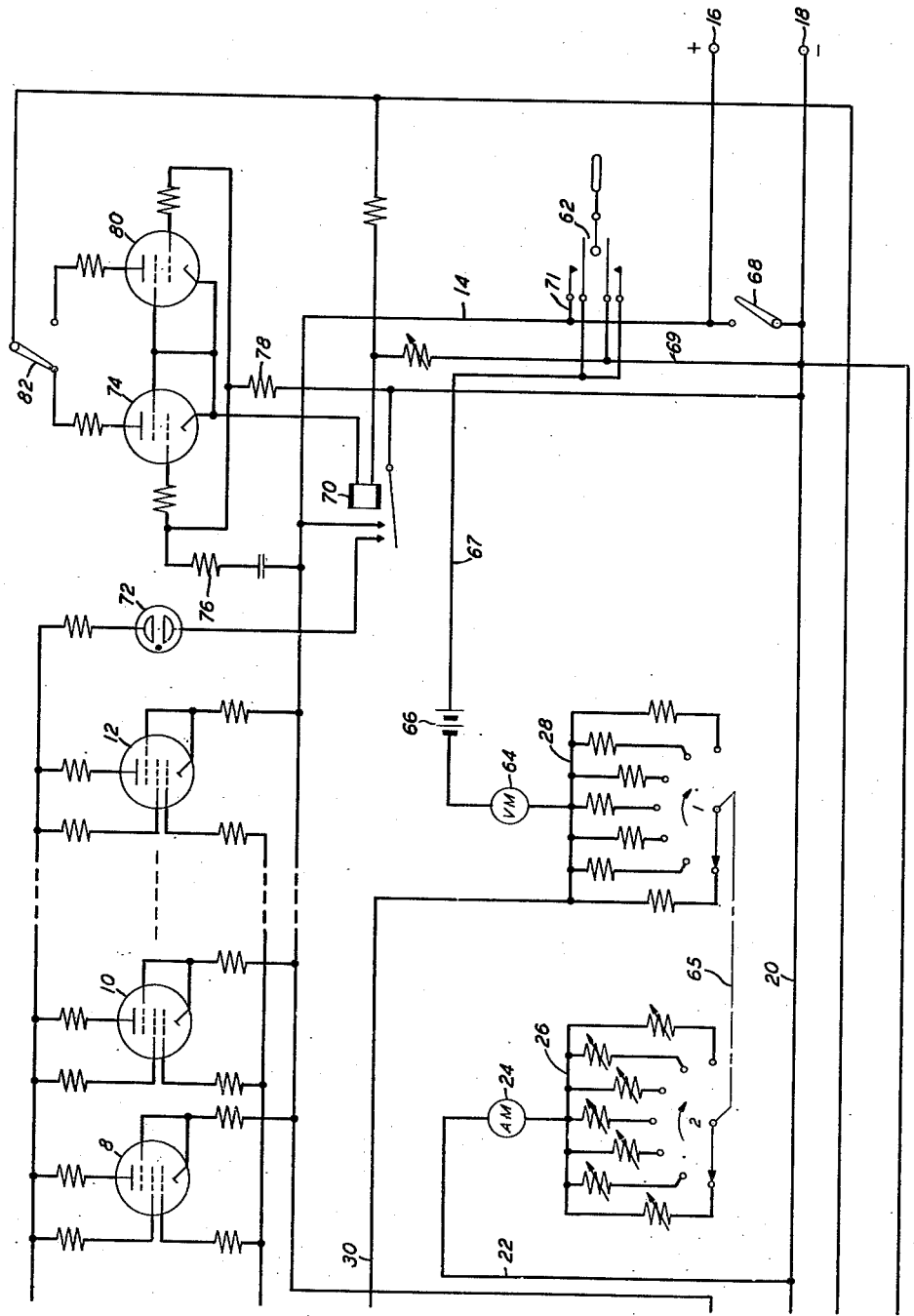

This and other features of the invention will be more clearly understood from the following detailed description and the accompanying drawings in which:

Figs. 1 and 2 show a complete circuit diagram of a preferred embodiment of the invention.

Referring now to Figs. 1 and 2, the test set is turned on by means of switch 1. The test or load circuit may be traced from the line voltage supply 2, through the main rectifier 4, over conductor 6 to the anodes of series tubes 8, 10 and 12, from the cathodes of the series tubes over conductor 14, through test resistor terminals 16 and 18, over conductors 20 and 22, through the ammeter 24, through one of the variable resistors 26, through one of the resistors 28, over conductor 30 and through lamp 32 back to the rectifier 4. An auxiliary rectifier 34 is used to draw current through the series tubes 8, 10 and 12 when the voltage across the combination of resistors 26 and 28 is set at zero, thus eliminating ever having to operate said tubes at complete cut-off. The positive side of this rectifier is connected to the negative side of the main rectifier while the negative side is connected through resistor 36 and one or more of resistors 38 to the cathode resistors of the series tubes. Current from the series tubes is allowed to flow through resistors 36 and 38 to the negative side of the auxiliary rectifier so that the tubes are not completely cut off at zero output voltage.

Batteries 40 and 42 are used as voltage references for setting the voltage applied to the load. These batteries are in the feedback path which may be traced from ammeter 24, over conductors 22, 20 and 44, potentiometer 48, and through battery 42 to the control grid of tube 50. Tubes 50 and 52 constitute a three-stage direct-current amplifier, the output of which is fed through one or more of bias batteries 54, 56 and 58 to the control grids of series tubes 8, 10 and 12. Battery 60 disposed in the path between the output of tube 50 and the input of tube 52 is also employed as a "C" battery for obtaining proper bias.

As already noted the test resistor is located in the test circuit between the cathodes of the series tubes and the ammeter 24 which is connected to the variable and fixed resistors 26 and 28, and the feedback connection is made from the junction of the test resistor and ammeter to the control grid of tube 50. Hence, the circuit maintains constant voltage across the combination of resistors 26 and 28 and since this is a constant resistance, a constant current must flow through the test resistor connected thereto.

Reading the voltage across the test resistor in a constant current circuit with an ordinary voltmeter would normally change the voltage across the resistor. However, with the present invention it is possible to make such a measurement without changing the voltage. When key 62 is moved upward voltameter 64 is connected in series with battery 66 across ammeter 24 and the combination of resistors 26 and 28 over the circuit which includes conductor 67, switch 71 and conductors 69, 20 and 22. Potentiometer 48 is then adjusted for a zero reading on voltmeter 64. The resistors 26 and 28 are adjusted by means of switch 65 for the desired current on ammeter 24. A slight readjustment of potentiometer 48 and resistor 26 may be necessary to obtain both the zero reading on the voltmeter and the desired current reading on the ammeter. The voltage of battery 66 is now set up across the combination of ammeter 24 and resistors 26 and 28. When key 62 is moved downward the voltmeter and battery 66 are connected across the test resistor and the combination comprising the ammeter and resistors 26 and 28 over the circuit which includes conductor 67, switch 71 and conductor 14. Battery 66 neutralizes the voltage drop across the combination of ammeter 24 and resistors 26 and 28 to allow only the voltage across the test resistor to appear across the voltmeter. The current drawn by the voltmeter flows from the cathodes of the series tubes 8, 10 and 12 to the negative side of rectifier 4 thereby causing no change in the test resistor current. Obviously, the current drawn by the voltmeter flows through battery 66 in a charging direction. Therefore, the higher the resistance of the voltmeter and the smaller this current is, the better the battery will hold is voltage and the more accurate will be the readings of voltage across the test resistor.

Switch 68 is used to switch the test resistor in or out. It should be in the closed or shorted position when changing resistors. Relay 70 will short the test resistor terminals 16 and 18 and light the lamp 72 when energized. The voltage drop across terminals 16 and 18 is expected, in case an open circuited test resistor is suddenly encountered, to cause tube 74 to fire and operate relay 70. Some adjustment of resistor 76 or resistor 78 may be found desirable to secure tripping of the protective circuit when needed and not when just switching in a test resistor. As disclosed in my patent application Serial No. 406,798 filed January 28, 1954, now Patent No. 2,754,467, relay 70 will be kept in its operated or protecting condition as long as it is necessary by either tube 74 or tube 80 since the reset switch 82 will always be closed with respect to one of these tubes.

Resistors 26 and 28 provide enough range to set constant currents ranging from one microampere to 0.6 ampere. However, alternating-current ripple across the test resistor will become a problem at small currents if some capacity (not shown) is not placed across the resistor. The alternating-current ripple should be kept as small as practicable. If too large, it will interfere with the operation of the protective circuit and may result in erroneous voltage measurements across the test resistor if the latter is nonlinear.

Potentiometer 86 is employed to counteract the reduction in plate supply voltage produced by light loads on the test set. It controls the screen voltage on tubes 88 and 50, and if a large enough fraction of the reduction in plate voltage is fed to the screens of tubes 88 and 50 it can cause such a rise in the plate potential of tube 50 and hence in the grid potentials of series tubes 8, 10 and 12 that the output voltage across resistors 26 and 28 will actually rise if their combined resistance is decreased.

The best setting of potentiometer 86 with respect to load will not necessarily give the most constant output voltage for changing power line voltage. A rise in voltage from potentiometer 86 for increasing line voltage will result in a drop in output voltage. However, potentiometer 90, by impressing a fraction of the —300 volt supply on the suppressor of tube 50, tends to provide rising output voltage for increasing line voltage. Hence, potentiometers 86 and 90 may be adjusted simultaneously to minimize the effects of both line voltage and moderate load current changes on output voltage.

As larger load currents are drawn the temperature of the filament of lamp 32 rises and its resistance increases in a nonlinear fashion. The drop across it reduces the screen voltage of tube 50, thus tending to increase the plate potential of tube 50 and the output voltage of the test set. This is effective only in the higher current output range where it is needed.

Tube 88 is employed to minimize the effect on output voltage of the small changes in heater voltage. Potentiometer 92 is used to match the characteristics of tubes 88 and 50. The effects on circuit performance caused by changes in the screen voltage of tube 88 produced by voltage drops across potentiometers 86 and 94 are incidental and unimportant due to the low value of the common cathode resistor, potentiometer 92.

It is to be understood that the above-described arrangements are illustrative of the application of the principles of the invention. Other arrangements may be devised by those skilled in the art without departing from the spirit and scope of the invention.

What is claimed is:

1. Apparatus for measuring the voltage-current characteristic of a test resistor under uniform direct-current conditions comprising a source of constant voltage, a series circuit including said source of voltage, an ammeter, said test resistor and a linear resistor, a voltmeter and a battery connected in series, switching means for placing said voltmeter and battery first across the combination of said ammeter and linear resistor and then across the combination of said ammeter, said test resistor and said linear resistor, means for automatically maintaining the stability of the voltage applied to said linear resistor, means for regulating the voltage drop across said linear resistor to obtain a zero reading on said voltmeter when said voltmeter and battery are first connected across said ammeter and linear resistor.

2. Apparatus for measuring the voltage-current characteristic of a test resistor under uniform direct-current conditions comprising an automatic voltage regulator circuit of the type having a series regulator tube and a control amplifier, said amplifier having input and output circuits, an ammeter, a linear resistor, a source of direct current connected in series with said regulator tube, said ammeter, said test resistor and said linear resistor, said test resistor being connected between said regulator tube and the combination of said linear resistor and ammeter, means connecting said amplifier output circuit to said regulator tube, means connecting the point common to said test resistor and said combination of linear resistor and ammeter to said input circuit, a voltmeter and a battery connected in series, switching means for placing said voltmeter and battery first across the combination of said ammeter and linear resistor and then across the combination of said test resistor, said ammeter and said linear resistor, the voltage drop across said battery being such as to neutralize the voltage drop across the combination of said ammeter and linear resistor.

3. Apparatus for measuring the voltage-current characteristic of a test resistor at a specified constant current comprising an automatic voltage regulator circuit of the type having a series regulator tube and a control amplifier, said amplifier having a control grid, input and output circuits, a linear resistor, said test resistor being serially connected between said regulator tube and said linear resistor, a source of direct current connected in series with said regulator tube, said test resistor and said linear resistor, means connecting said amplifier output circuit to said regulator tube, means connecting the point common to said test resistor and said linear resistor to said input circuit, a voltmeter and battery connected in series, switching means for placing said voltmeter and battery first across said linear resistor and then across the combination of said linear resistor and said test resistor, a source of unipotential voltage in said input circuit between said linear resistor and the control grid of said control amplifier for establishing the value of the voltage across said linear resistor, means for regulating said source of unipotential voltage so that the voltage drop across said battery will neutralize the voltage drop across said linear resistor when said voltmeter and battery are first connected across said linear resistor.

4. Apparatus for measuring the voltage-current characteristic of a test resistor at a specified constant current comprising an automatic voltage regulator circuit of the type having a series regulator tube and a control amplifier, said amplifier having a control grid, input and output circuits, a linear resistor, said test resistor being serially connected between said regulator tube and said linear resistor, a source of direct current connected in series with said regulator tube, said test resistor and said linear resistor, means connecting said amplifier output circuit to said regulator tube, means connecting the point common to said test resistor and said linear resistor to said input circuit, a voltmeter and battery connected in series, switching means for placing said voltmeter and battery first across said linear resistor and then across the combination of said linear resistor and said test resistor, a source of unipotential voltage in said input circuit between said linear resistor and the control grid of said control amplifier for establishing the value of the voltage across said linear resistor, means for regulating said source of unipotential voltage so that the voltage drop across said battery will neutralize the voltage drop across said linear resistor when said voltmeter and battery are first connected across said linear resistor, means responsive to a voltage drop of predetermined value across said test resistor for short-circuiting said resistor.

5. Apparatus for determining the voltage-current characteristic of a nonlinear resistor under uniform direct-current conditions comprising an automatic voltage regulator circuit of the type having a series regulator tube and a control tube, said control tube having a control electrode, a screen electrode, a suppressor electrode, input and output circuits, a line voltage supply, a main rectifier and an auxiliary rectifier fed from said voltage supply, the positive side of said auxiliary rectifier being connected to the negative side of said main rectifier, an ammeter, a linear resistor, said nonlinear resistor, said ammeter and said linear resistor being serially connected with said regulator tube between the positive and negative sides of said main rectifier, said nonlinear resistor being connected between said regulator tube and the combination of said ammeter and linear resistor, means connecting the control tube output circuit to said regulator tube, means connecting the control tube input circuit to the point common to said nonlinear resistor and said combination of ammeter and linear resistor, a source of unipotential voltage in said control tube input circuit for establishing the value of the voltage across said combination of ammeter and linear resistor, a first potentiometer connected in shunt with said main rectifier, a second potentiometer connected in shunt with said auxiliary rectifier, a portion of the voltage drop across said first potentiometer being impressed on the screen electrode of said control tube, a portion of the voltage drop across said second potentiometer being impressed on the suppressor electrode of said control tube, said potentiometers being adapted to be adjusted simultaneously to minimize the effects of line voltage and load current changes on the voltage across said ammeter and linear resistor, a voltmeter and battery connected in series, switching means for placing said voltmeter and battery first across said ammeter and linear resistor, and then across said nonlinear resistor, ammeter and linear resistor, means for regulating said source of unipotential voltage so that the voltage drop across said battery will neutralize the voltage drop across said ammeter and linear resistor when said voltmeter and battery are first connected across said ammeter and linear resistor.

6. Apparatus for determining the voltage-current characteristic of a nonlinear resistor in accordance with claim 5 in combination with means responsive to a voltage drop of predetermined value across said nonlinear resistor for short-circuiting said resistor.

References Cited in the file of this patent
UNITED STATES PATENTS

| | | |
|---|---|---|
| 2,509,027 | Zimmermann | May 23, 1950 |
| 2,556,129 | Wellons | June 5, 1951 |
| 2,710,375 | Mangali | June 7, 1955 |